US007277931B1

(12) United States Patent
Booth et al.

(10) Patent No.: US 7,277,931 B1
(45) Date of Patent: *Oct. 2, 2007

(54) REPRESENTING, CONFIGURING, ADMINISTERING, MONITORING, AND/OR MODELING CONNECTIONS USING CATALOGS AND MATRIXES

(75) Inventors: Earl Hardin Booth, Durham, NC (US); Charles Bruce Dillon, Morrisville, NC (US); Bret Elliott Harrison, Clayton, NC (US); Sanjay Damodar Kamat, Ossining, NY (US); Charles Steven Lingafelt, Durham, NC (US); Walter Cade Metz, Raleigh, NC (US); Rajendran Rajan, Bronx, NY (US); Leo Temoshenko, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/327,708

(22) Filed: Jun. 8, 1999

Related U.S. Application Data

(60) Provisional application No. 60/138,172, filed on Jun. 8, 1999.

(51) Int. Cl.
*G06F 15/177* (2006.01)
(52) U.S. Cl. .................. 709/220; 709/219; 370/352

(58) Field of Classification Search ............... 709/238, 709/242, 239, 227, 228, 220, 219; 370/216, 370/236, 230, 352
See application file for complete search history.

(56) References Cited

U.S. PATENT DOCUMENTS

| 5,761,502 | A | * | 6/1998 | Jacobs ...................... 395/614 |
| 5,867,495 | A | * | 2/1999 | Elliott et al. ................ 370/352 |
| 5,870,558 | A | * | 2/1999 | Branton, Jr. et al. .... 395/200.54 |

(Continued)

*Primary Examiner*—Jason Cardone
*Assistant Examiner*—Adnan M. Mirza
(74) *Attorney, Agent, or Firm*—Ido Tuchman; Lisa M. Yamonaco

(57) ABSTRACT

A method, apparatus, computer product and structure is presented for representing and managing large amounts of information concerning networks of elements. While being useful for communication networks, it can be also usefully deployed in the context of other networks such as distribution and transportation networks. The method uses a hierarchical construct called "catalog"—a set of elements (which could be "atomic" elements or catalogs themselves)—to organize information about physical or abstract entities relevant for modeling the network. A matrix construct whose rows and columns constitute such elements are used to model connections at different levels of abstraction. A common framework and representation provided using these two constructs is shown to be useful for visualization, administration, configuration, modeling, monitoring and manipulation of the network.

51 Claims, 13 Drawing Sheets

U.S. PATENT DOCUMENTS

| | | |
|---|---|---|
| 5,926,459 A * | 7/1999 | Lyles et al. .................. 370/230 |
| 5,999,192 A | 12/1999 | Selfridge et al. |
| 6,151,024 A | 11/2000 | Alimpich et al. |
| 6,151,582 A | 11/2000 | Huang et al. |
| 6,167,396 A | 12/2000 | Lokken |
| 6,185,576 B1 | 2/2001 | McIntosh |
| 6,281,896 B1 | 8/2001 | Alimpich et al. |
| 6,292,894 B1 | 9/2001 | Chipman et al. |
| 6,314,434 B1 | 11/2001 | Shigemi et al. |
| 6,381,711 B1 | 4/2002 | Chiang et al. |
| 6,415,298 B1 | 7/2002 | Oesterer et al. |
| 6,563,793 B1 * | 5/2003 | Golden et al. .............. 370/236 |

* cited by examiner

|  | Endpoint 1 | Endpoint 2 | Endpoint 3 | Endpoint 4 | Endpoint 5 | Endpoint 6 | Endpoint 7 |
|---|---|---|---|---|---|---|---|
| Endpoint A | | | | | | | |
| Endpoint B | | | | | | | |
| Endpoint C | | | | | | | |
| Endpoint D | | | | Intersection of Element 4 with Element D | | | |
| Endpoint E | | | | | | | |
| Endpoint F | | | | | | | |
| Endpoint G | | | | | | | |

"ABC" Catalog of Endpoints — 310
"123" Catalog of Endpoints — 320

Fig. 3

"123" Catalog of Endpoints

| | Endpoint 1 | Endpoint 2 | Endpoint 3 | Endpoint 4 | Endpoint 5 | Endpoint 6 | Endpoint 7 |
|---|---|---|---|---|---|---|---|
| Endpoint A | | | | BEEP!! BEEP!! BEEP!! | | | |
| Endpoint B | | | | | | | |
| Endpoint C | | | | | | | |
| Endpoint D | | | | | | | |
| Endpoint E | | | | | | | |
| Endpoint F | | | | | | | |
| Endpoint G | | | | | | | |

"ABC" Catalog of Endpoints

Fig. 10

REPRESENTING, CONFIGURING, ADMINISTERING, MONITORING, AND/OR MODELING CONNECTIONS USING CATALOGS AND MATRIXES

CROSS REFERENCE

This invention application is cross referenced with application Ser. No. 60/138,172 filed Jun. 8, 1999, entitled, "DISPLAYING, ORGANIZING AND EMPLOYING EMBEDDED INFORMATION," by Louis Herzberg et al., even-dated herewith, and is incorporated herein by reference in entirety.

FIELD OF THE INVENTION

This invention relates to the field of network connection. More particularly, the invention relates to user interface and representation of connectivity.

BACKGROUND OF INVENTION

This invention addresses the problem of intuitively representing and managing large data stores of information relating to network configuration, connectivity, resource utilization, connection management and service availability. Although this problem is particularly relevant in computer controlled communications networks, it is also prevalent in other types of networks which require specified interconnectivity of a large multiplicity of network elements. Network administrators lack intuitive tools to retrieve and view status of network elements organized in a number of different formats, such as by user, by host, by connection type etc. The administrators also need simple means of querying, adding and deleting information from the store.

Broadly speaking, there are two general methods of configuring, administering, monitoring modeling networks: graphical and non-graphical. This invention defines a method of using a non-graphical intuitive method for organizing information using "catalogs" (or lists), methods for creation and manipulation of elements within catalogs, methods for presentation of catalogs, manipulation of catalogs and linking of tasks to catalog elements.

In networks with more than a few connections between network elements, graphical methods that show connections among network elements as visible lines are hampered by the size of display area required to show the connections in a useful way. This method is also limited in the amount and type of information about the connection and network elements that can be shown. Practically, with more than a few 10s of connections, the number of lines becomes so large that a graphical display (either on screen or on paper) becomes too cluttered to be useful. FIG. 1 shows an example of a network 100 having ten elements, 101-110, which are mesh connected. No additional information (such as type of link, link status, traffic load, configuration options, etc.) beyond connectivity among elements is shown in the figure. Even with only this one piece of information, the graphical image is beginning to become unusable. Thus a better method of representing connections between network elements is needed.

The following are definitions of terms as used herein:
Network Element—the start or end point of a connection.
Sub-element—element that is a member of a catalog that is itself an element in a catalog.
Catalog—a named set of elements. The catalog elements can be atomic or can themselves be a catalog, thus enabling catalogs of catalogs of catalogs and so on.
Sub-catalog—A catalog included in another catalog.

SUMMARY OF INVENTION

It is therefore an aspect of the present invention to present a method, apparatus and architecture for the representation visualization, manipulation, administration, monitoring and modeling of connections between elements of a network.

The invention includes catalogs of elements and the manipulation of elements and/or catalogs, matrix display and/or representation of catalogs and manipulation of the matrix.

Aspects of this invention include:
the ability to represent, in a practical method, a large plurality of connections;
the ability to configure the connections;
the ability to abstract different level or views of the network;
the ability to show information about the connections organized on the basis of different parameters;
the ability to monitor, execute problem determination tasks and tune the connections; and
the ability to use the same information model/connection representation as input to modeling tools.

Another aspect of this invention is the ability to use a common view of the network for configuration, monitoring, problem determination, tuning, modeling, etc.

These and other objects are provided in a connection representation scheme wherein a connection matrix is employed. Other objects and a better understanding of the invention may be realized by referring to the Detailed Description.

BRIEF DESCRIPTION OF THE DRAWINGS

These and other objects, features, and advantages of the present invention will become apparent upon further consideration of the following detailed description of the invention when read in conjunction with the drawing figures, in which:

FIG. 3 shows a matrix with Catalog "123" versus Catalog "ABC" with one connection identified;

FIG. 10 shows an example of a matrix of connections showing possible monitoring method;

DETAILED DESCRIPTION OF THE INVENTION

This invention provides methods, apparatus and computer related articles for connection representation used for configuration, administration, monitoring, modeling etc. In a prime use of this invention the connections are logical connections, often referred to as overlay networks. For example, it provides input/output modeling in a network-wide view of network elements for VPNs, QoS overlay networks, etc. This invention can also be used on other overlay networks such as VLANs. The connections are not required to be logical but can be physical as well; i.e., this invention can also be used in the context of non-overlay networks, e.g. for showing the physical connectivity between network elements.

Figure 1:
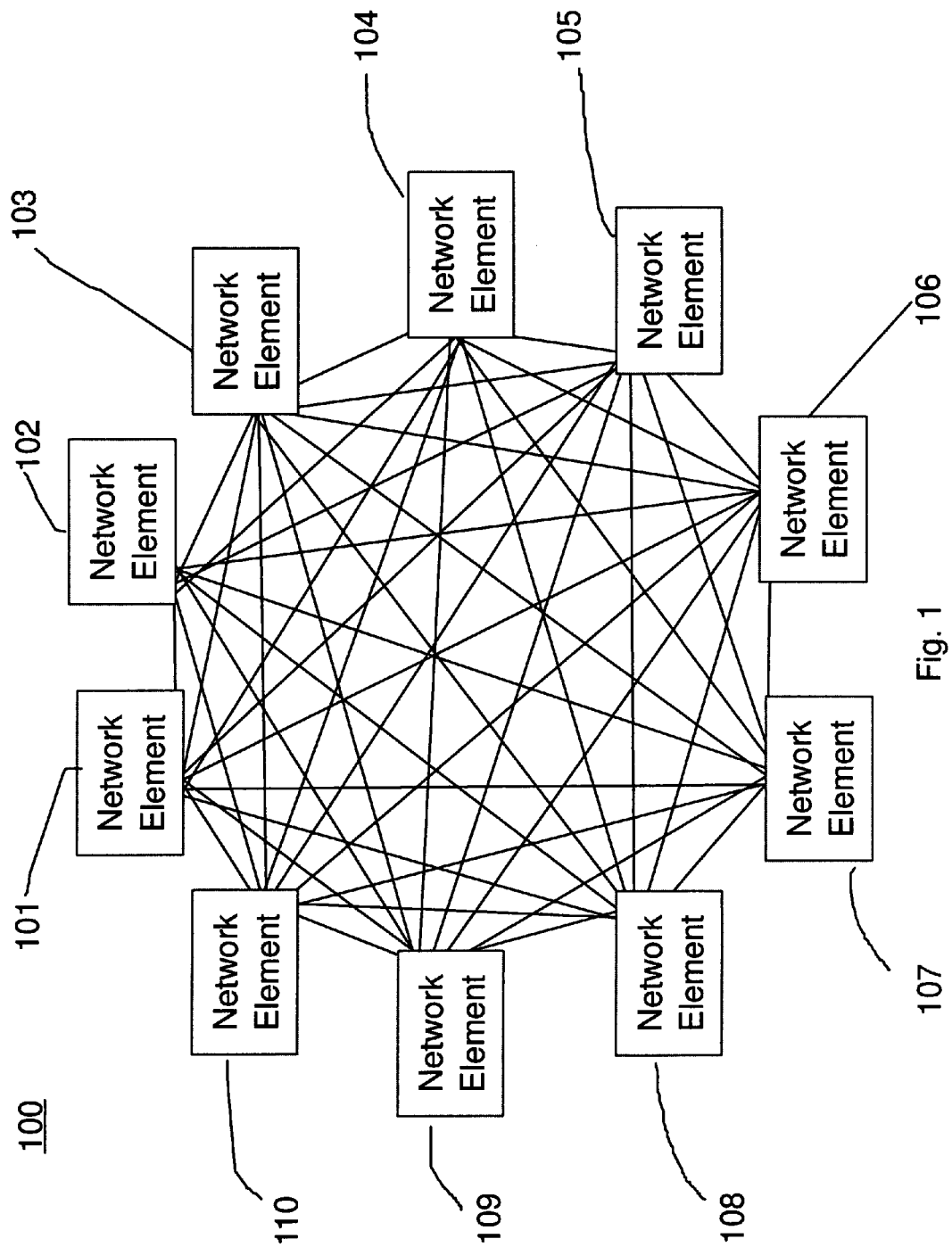
FIG. 1 shows a graphical representation of 10 network elements mesh connected.
Figure 2:
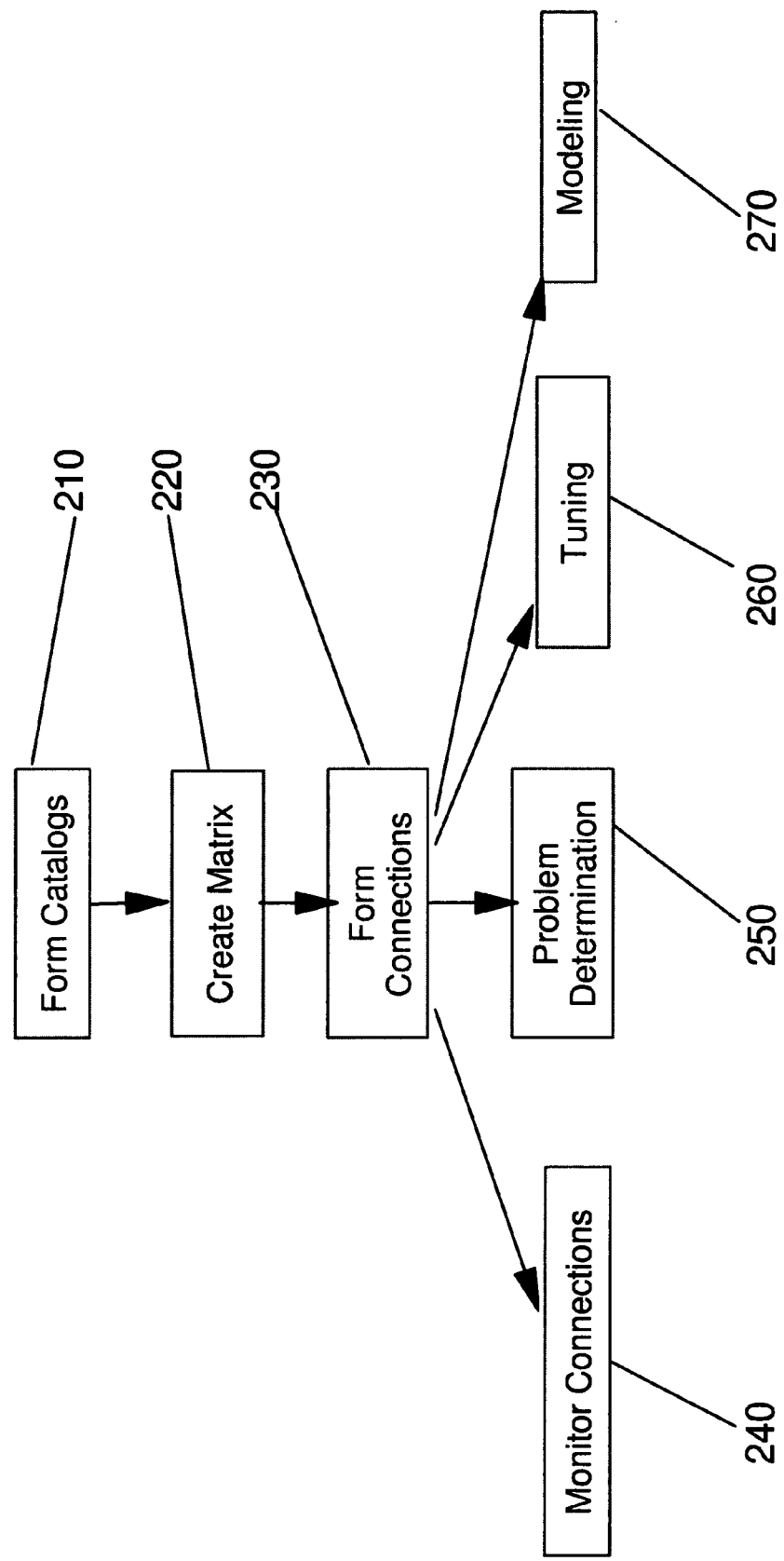
FIG. 2 illustrates an example of a High-level flow of method.

An example embodiment of a method to implement the invention is shown in FIG. 2. In 210, catalogs are formed. In 220, the matrix is created and displayed. In 230 a connection representation between pairs of elements in the catalog is formed. From this connection information, actions may be taken within the network to cause the network to instantiate the connections that are defined in 230. The network administrator uses the matrix created in 230 as a basis for monitoring 240, problem determination 250, tuning 260 and/or modeling 270, etc.

It is advantageous to form catalogs of elements considered for interconnection by themselves. Thus, each instance of an object class or type is in a list or catalog. There can be multiple catalogs of the same object class. For example, in the object class of routers, one catalog includes all routers on the west coast, and a separate catalog includes all routers in the east cost. Catalog elements are manipulated such that a new catalog is created from the intersection or union of existing catalogs. Elements can be ordered, added, moved and deleted from one or more catalogs. Examples of object classes (the type of catalogs) include one or more of the following:

- Endpoint catalog—which includes a set of endpoint elements that can connect to other end point elements.
- QoS catalog—which includes the types of (Quality of Service) QoS that are available, e.g. guaranteed latency, guaranteed bandwidth, best effort, etc.
- Tunnel catalog—which includes the types of IPSec tunnels that are available, e.g. weak tunnel, normal secure tunnel, extremely secure tunnel, etc.
- Encryption methods catalog—which includes the types of encryption that are available, e.g. DES, 3DES, RC4, blowfish, etc.
- Validity catalog which includes the times that the connection is valid, e.g., normal business hours, not first shift, Saturdays 10 to 11 AM, etc.
- Action catalog—which includes the type of actions that a user can do, e.g. halt traffic between the endpoints, cause an IPSec key exchange to occur immediately, update the monitoring information, etc.
- Traffic Loading catalog—which includes the network traffic characteristics (e.g. frame size distribution, frame transmission distribution) for use as loading input to a network model.

Catalogs may be hierarchical such that the definition of an element in a "higher" level catalog may be created from and/or with elements of "lower" level catalogs. For example, in creating the tunnel catalog, one can select elements from a type of encryption catalog, a validity time period catalog, etc. This hierarchical construct allows multiple levels of abstraction.

The catalogs are advantageously displayed using a matrix method. An example embodiment creates a catalog/element matrix with the elements of one or more catalogs along row and column edges of the matrix. The intersection of the elements in the matrix form a cell (or block) which is useful to define actual or potential connectivity. By manipulation of the elements in the catalog, the network administrator determines which sets of catalog elements are shown. This provides a way of practically grouping and viewing connectivity. It is also a method of abstraction because catalog elements can themselves be catalogs. FIG. 3 shows a representative GUI, 300, showing the catalog matrix with the "ABC" catalog, 310 and the "123" catalog, 320, with the intersection, 330, of element 4 and element d identified.

An embodiment creates directionality (simplex connections) either within an intersection cell or by the positional construct of one catalog's elements (say the one displayed on the vertical axis) to the other catalog's elements (say the one displayed on the horizontal axis) in that single direction only. For example, in FIG. 3, intersection (D,4), 330, has a connection directed from Endpoint D, 314, to Endpoint 4, 324, but not a connection directed from Endpoint 4 to Endpoint D.

If the intersection cell represents duplex connections, the intersection exists twice in the matrix as intersection (D,4) and intersection (4,D). In some embodiments the duplex intersection cells are shown as mirror images of each other. Sometimes the intersection cell connection in one direction is shown shaded gray, while the connection in the other direction is shown unshaded.

Multiple connections between the same endpoints are created within the intersection block by logically "stacking" the intersection blocks. For example, for each connection (either simplex and/or duplex) a block is created. Each block represents a particular logical connection. Thus, a matrix with three dimensional (3-D) towers is created. Three connections, 401-403, between the same endpoints are shown in the common intersecting cell 410 in FIG. 4.

Figure 4:
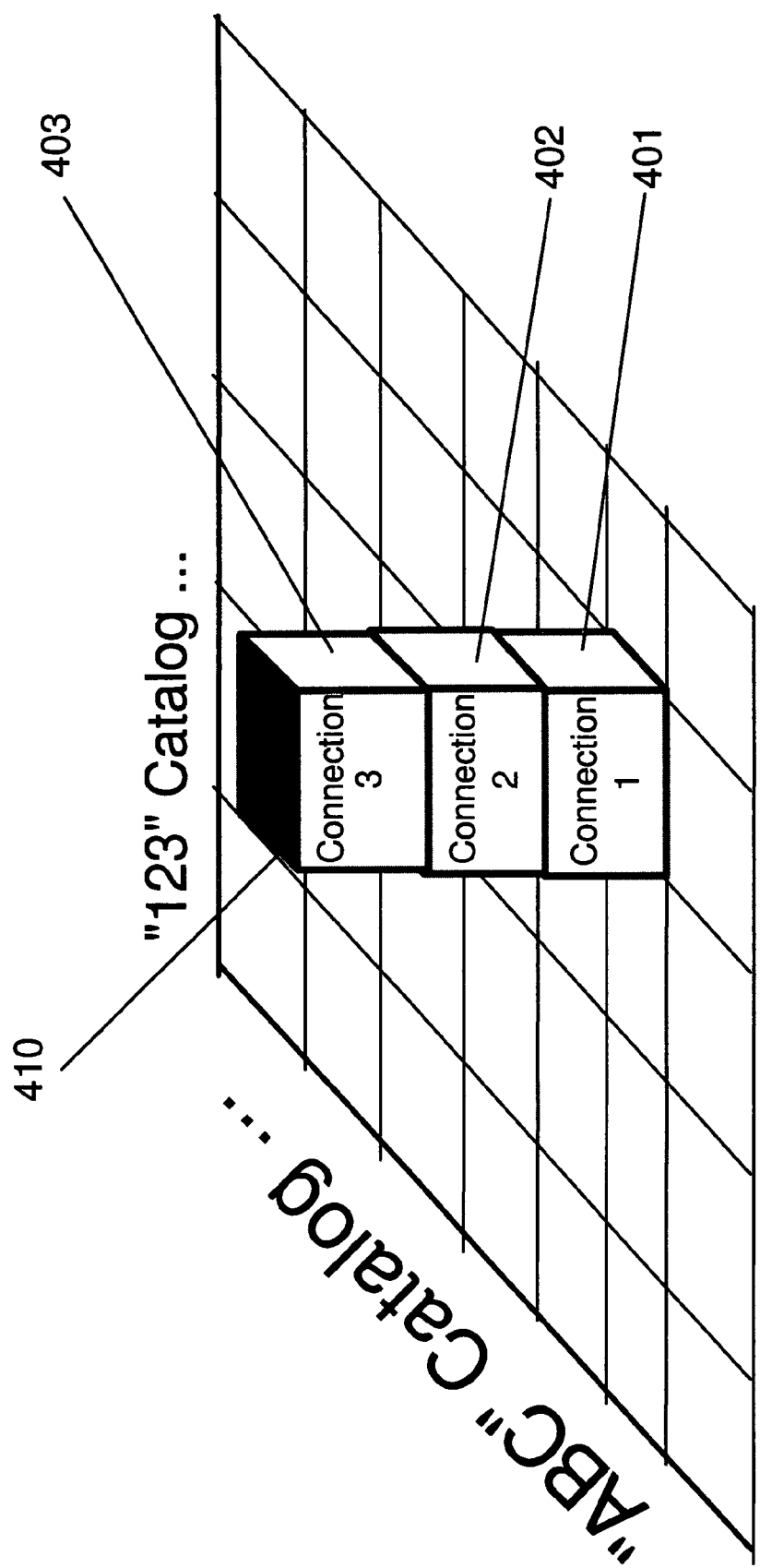
FIG. 4 shows a matrix with multiple connections at the same intersection identified.

In a GUI implementation, multiple connections are advantageously shown by either a 3-D method, as illustrated in FIG. 4, item 410, or by a graphic within the cell indicating that there are additional blocks "under" the currently visible block.

For simplicity in illustrating the concepts of the present invention, only one duplex connection is shown between endpoints in the figures that follow. However, those familiar with the art can easily implement the concepts using other beneficial implementations for single, duplex and/or multiple connections.

It is noted that the elements along a matrix axis can be members of more than one catalog, and/or more than one catalog can be displayed on each axis of the matrix. Generally, both catalogs of elements, and elements that are not in and of themselves catalogs may be displayed simultaneously on an axis. Additionally, it should be realized that the same catalog or set of catalogs or elements can be display on both axes. When this occurs and connectivity is assumed for all matrix intersections, a mesh connected network results.

A star connected network results when a catalog having multiple elements (or even other catalogs) is assigned to one axis, a single element is assigned to the other axis, and connectivity is assumed for all matrix intersection cells.

The matrix display of catalogs is extended beyond the concept of using the intersection of catalog elements, to the concept of using each catalog element itself. In the example that follows, the catalogs contain routers, or network elements, that proxy or act as a gateway for sets of network elements located "behind" the router.

Figure 5:
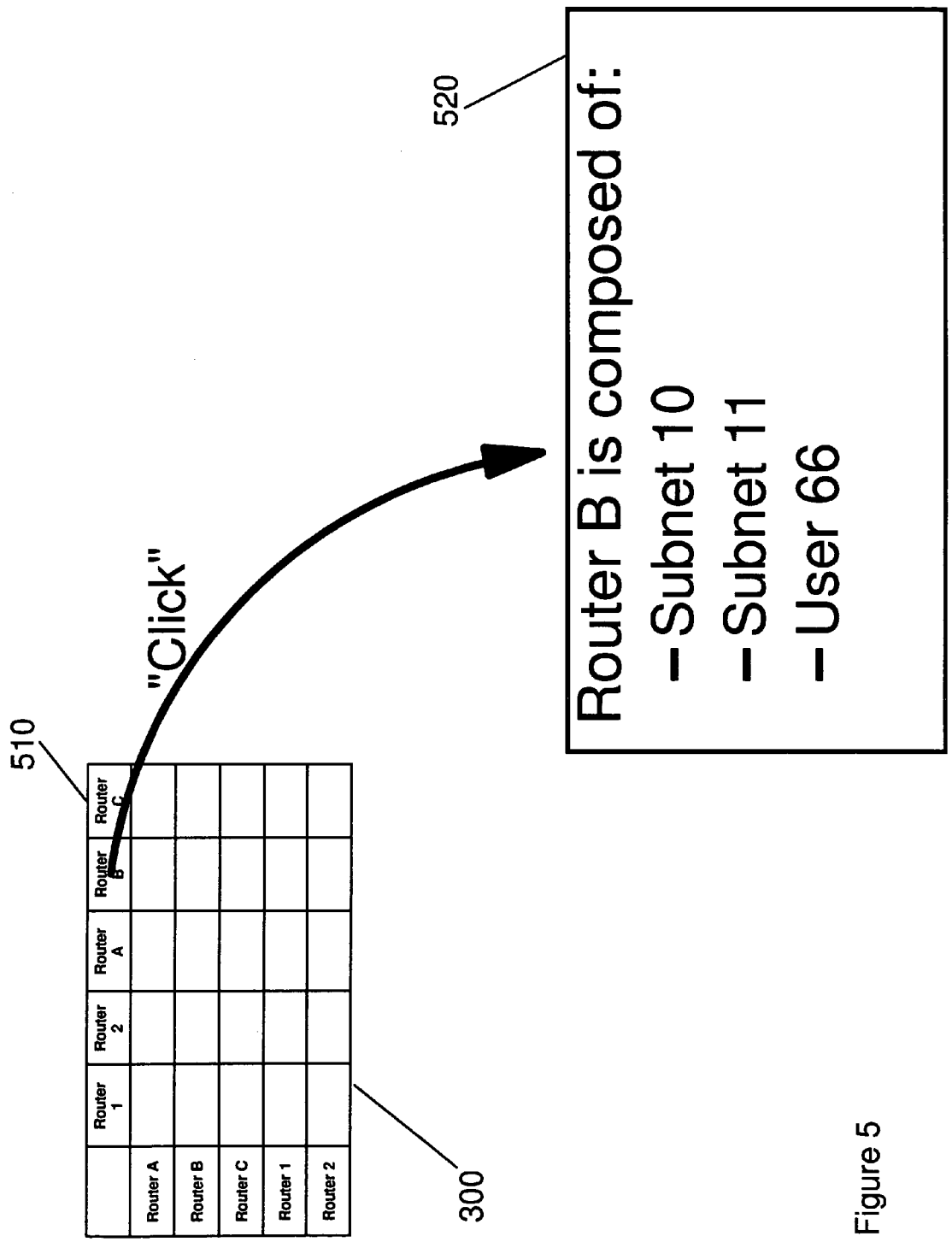
FIG. 5 shows an expansion of a Catalog Element.

FIG. 5 shows a case which uses matrix, 300, when the user selects ("clicks on") a catalog axis element, 510. In this situation, information about the constitution of the catalog element is displayed, 520.

Figure 6:
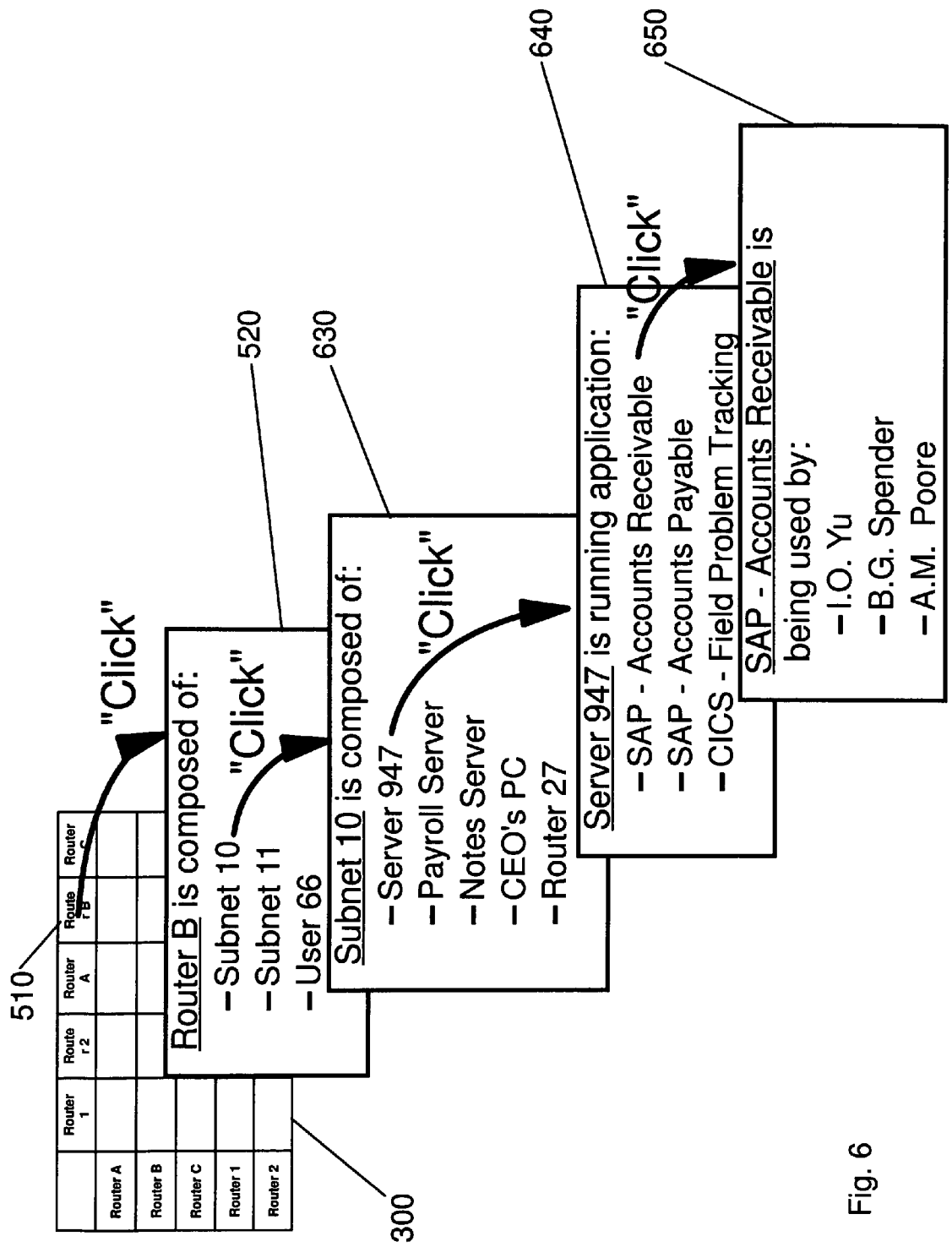
FIG. 6 shows an expansion of a Catalog Element that is in itself a Catalog.

This approach is extended to elements of a catalog that are in and of themselves a catalog. In this situation catalog/elements are embedded within other catalog/elements. FIG. 6, shows a case using matrix 300, wherein one selects element, 510, and obtains that which constitutes this element, 520. Now, when one selects ("clicks on") Subnet 10, in 520, a sub-catalog 630 is displayed. Sub-catalog 630 is a list of network elements within Subnet 10. Now, when one selects ("clicks on") one of the network elements of catalog 630, one is shown a sub-catalog, 640. In this case, sub-catalog 640 is a list of applications executing on that network element. Since, in general, network elements are not limited to traditional network equipment, but may also include hosts and clients, representation of additional relevant information is possible. For example, one could further select (click-on) one of the applications and be shown a catalog, 650, (a list) of users of that application. Furthermore, one could select (click-on) a user and view usage statistics about that user. This process can continue to show more and more embedded information regarding a connection.

Figure 7:
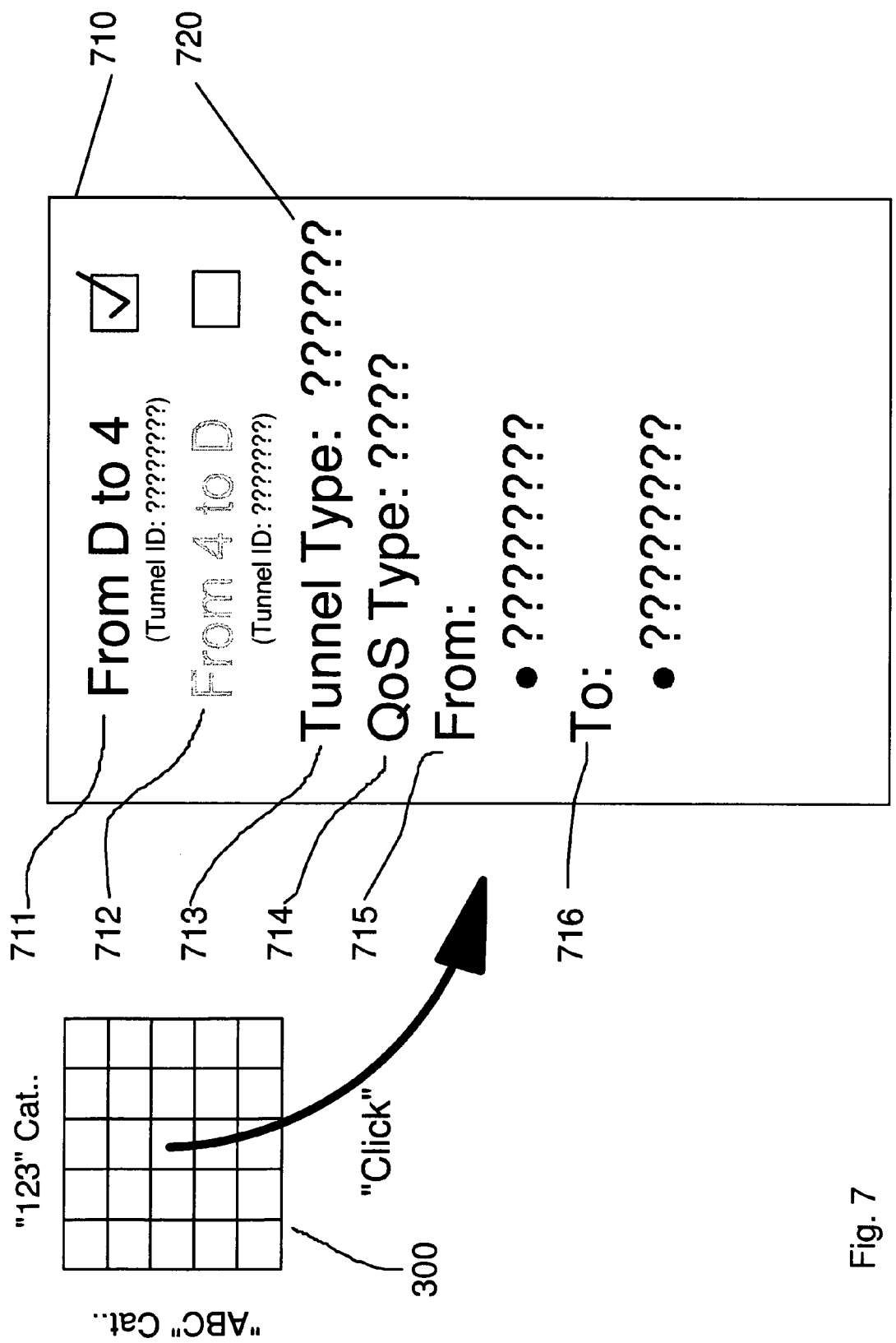
FIG. 7 shows an example of input/output block for a connection identified by the intersection of catalog elements.

Now we consider an example of an initial configuration. It is noted that details of this step are generally implementation dependent and may also vary with the network type. FIG. 7 shows a way to configure connectivity between two endpoints. In this simplified example, it is assumed that a user is trying to configure an IPSec based VPN and must specify the type of tunnel, the type of QoS and the user of the tunnel. The network administrator displays the catalogs of interest along the edges of the matrix, 300, and selects (clicks on) an intersection of endpoints within the matrix. This brings up, 710, which is a set of catalogs or lists which offer the connectivity attributes that can be or should be set or a wizard to aid in the choices of appropriate values for the attributes.

For illustration simplicity and clarity, the concept of multiple connections between the same endpoints as noted above is not shown in the following illustrations.

Figure 8:
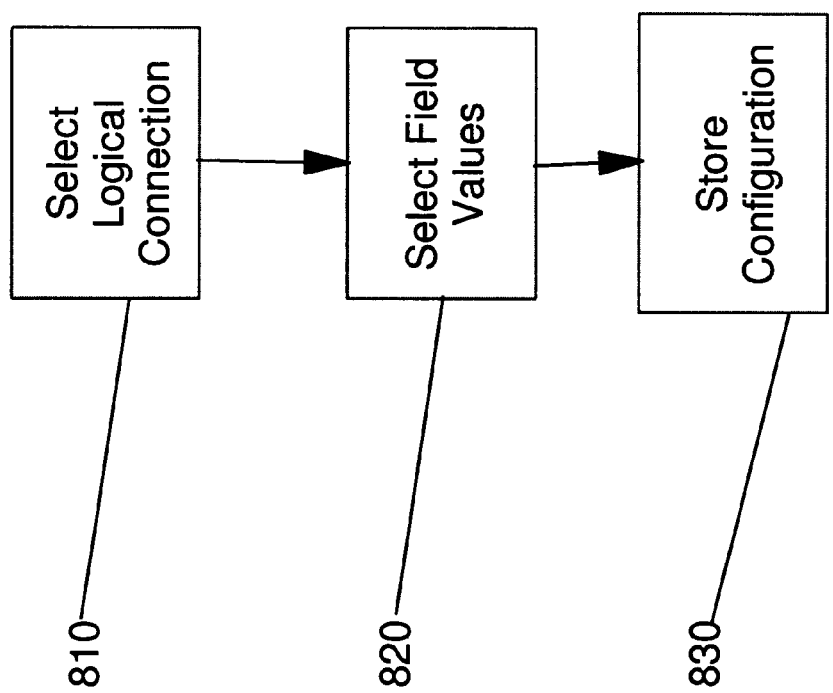
FIG. 8 shows an example of steps for configuring a network.

In one embodiment, the steps for configuring are as shown in FIG. 8.
  Step 1. Select Logical Connection by "clicking on" or selecting an intersection point 810. This brings up a "selection box" that contains fields for the pertinent information.
    [Thus, in the example of FIG. 7, each direction 711, 712, is configurable separately so as to give meaning to the From, 715, and To, 716, fields. It is assumed that the catalogs of tunnel types 713, QoS types 714, and potential tunnel users have been previously populated. The question marks 720 indicate fields that when selected, a "wizard" or catalog of possible values is displayed. For example, a wizard is displayed when the catalog of values is not complete or to help in selecting the value from a catalog.]
  Step 2. For each field, select a value from a catalog of possible values, 820.
  Step 3. After selecting values for all fields, the user has completed the configuration for the connection between the two end points and the configuration is stored for retrieval and/or display as desired, 830.

It is noted that all examples are only representative illustrations of the invention, and are not comprehensive enumeration of the fields that must be completed for configuration in a particular embodiment.

Figure 9:
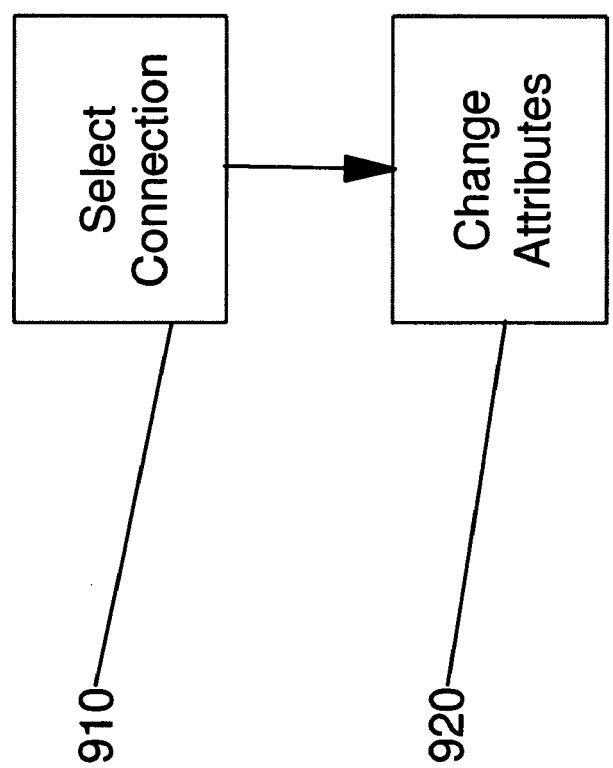
FIG. 9 shows an example of steps for changing a connection.

An embodiment for changing configuration is shown in FIG. 9. The same concept used for initial configuration is used for modifying an existing configuration. The steps are as follows:
  Step 1. Given a connection exists between two end points as shown by the intersection of an element from two matrix displayed catalogs, the user selects that connection from the matrix intersection that represents the connection, 910.
  Step 2. Given the matrix intersection connection selection, the user changes the attributes of the connection by "clicking-on" that selection, 920. This brings up a selection block that contains changeable information. For example, this may be the same selection block that was used to configure the connection. The user clicks on a changeable field which results in the display of a catalog whose elements could be used in the field, or a wizard may become available to configure the field.

Because the elements that form axis of the matrix can be catalogs in and of themselves, a matrix intersection cells can represent a catalog of connections. This catalog of connections can operate in a way similar to the way shown in FIG. 6. For example, assume a highest level catalog is named east coast. It includes elements which are in and of themselves catalogs, namely: Miami, Atlanta, Durham, and Hawthorn. Each of these includes elements which are in and of themselves catalogs. The Miami catalog has included elements, namely: router 1, router 2 router 3. Each of these included elements are catalogs that contain other included elements. Thus, router 1 catalog contains elements interface 1, subnet w.x.y.z, specific IP address a.b.c.d. and so on.

The phenomenon of embedding intersections within other intersections may continue as needed by the particular application and network. Thus one could begin with a 1×1 matrix of east coast verses east coast, which only has a single intersection cell. Selection of this single intersection cell, generates an expanded "submatrix" whose both axes contain cities, namely: Miami, Atlanta, Durham, Hawthorn. Selecting the intersection, Miami verses Miami, generates an expanded submatrix whose axis contains a list of routers, namely: router 1, router 2, router 3. Further, selecting the intersection, router 1 versus router 1, generates an expanded submatrix whose axis contains network components, namely: interface 1, subnet w.x.y.z, specific IP address a.b.c.d. One could then select any of these network component intersections, say interface 1 verse subnet w.x.y.z. This intersection represents this particular connection of the many possible within the network. This operation is herein referred to as matrix expansion. Matrix expansion is used to satisfy the needs of the particular application and/or user. It allows the systematic selection and display of any of the available levels of embedded intersection cells.

The concept of "matrix abstraction" may be employed with significant benefits in accordance with the present invention. This is because the matrix intersection of catalogs of catalogs represent a catalog of connections, one can abstract very large configurations and display these configurations by displaying the topmost catalog. The matrix representation of the topmost catalog is said to be abstracted from the main or total network matrix. Consider the case when a highest level catalog named east coast contains four elements. These four elements are in and of themselves sub-catalogs of cities, namely: Miami, Atlanta, Durham, Hawthorn. Assume that each of these cities have three elements. These three elements each further contain 3 elements which are in and of themselves sub-catalogs,

[For example, the Miami catalog contains elements which are router sub-catalogs, namely: router 1, router 2 router 3;

each of these router sub-catalogs contain 3 network elements, e.g., the router 1 catalog contains network elements, namely: interface 1, subnet w.x.y.z, specific IP address a.b.c.d.]

Then the total number of elements represented by the top-level catalog is 4×3×3=36 elements. This has a total of 1296 (36×36) connection possibilities which may be displayed in a systematic manner using the representation of the present invention. All of these result from the single cell 1×1 matrix of east coast versus east coast as the specified starting point. Thus, because a user can arbitrarily form catalogs, which can also be catalogs of catalogs, the user can abstract the connections to any level desired in accordance with the present invention.

A further benefit of the representation of the present invention is the concept of matrix inheritance. As noted, making use of the abstraction property, one defines a matrix with a row of one or more catalogs versus a column of one or more catalogs. Generally, one or more of the catalogs includes elements that are in and of themselves sub-catalogs. The concept of inheritance provides the ability of propagating an inheritable action and/or attribute to an entire inheritance group. In one embodiment this is accomplished just by performing, adjusting or setting that action/attribute at a group parent. In alternate embodiments the action/attribute is inherited by performing, adjusting or setting that action/attribute at any group member. Thus, when an action (e.g. setting a parameter) is done at a intersection cell, then this action is inherited by all elements of all the sub-catalogs of catalogs in the entire inheritance group.

For instance, if the highest level catalog, named east coast, contains 4 elements which are in and of themselves sub-catalogs, (named: Miami, Atlanta, Durham, Hawthorn), and each of these contains 3 elements which are in and of themselves sub-catalogs, (e.g., the Miami catalog contains router 1, router 2 router 3), and each of these contains 3 elements, (e.g. the router 1 catalog contains elements interface 1, subnet w.x.y.z, IP address a.b.c.d) and a 1×1 matrix of east coast versus east coast was specified, any action done to the intersection formed by the 1×1 (single-cell) matrix (being the group parent) is reflected into all the 1296 connections included within that single matrix cell.

In accordance with the present invention, the matrix display concept can be used in the context of monitoring of all or some connections. Given that the intersections in the matrix can indicate connections, one can display many dynamic parameters of elements, connections and/or catalogs with the use of colors or symbols. As an illustration, one embodiment uses the following color scheme, applied at the intersection point of elements in the matrix catalogs, to display status about connections between elements in the catalogs:

Black—connection is not currently configured;

Yellow—connection is configured, but not currently enabled;

Green—connection is configured, enabled and operating correctly;

Red—connection is configured and enabled but not operating correctly (e.g. QoS not being maintained); and Flashing Red with sound—connection has a serious problem, e.g. a potential security violation such as hacker attempting to insert traffic into the connection has been detected.

The different types for "monitoring" information that can be displayed is large and limited only by imagination of the implimentor. Other examples include performance or loading information, i.e. yellow—no traffic observed in last observation period, green—medium loading, red—more than 85% utilization, flashing red—excessive packet loss.

FIG. 10 shows a black and white example of displaying monitored connections using different types of cross hatched lines for different status items. It shows the status indicated by the direction of the slash.

1010 (No lines)—no connection configured;

1020 (Grid slashes)—connection configured, but not enabled;

1030 (Reverse slashes)—connection configured, enabled and operating correctly;

1040 (Horizontal slashes)—connection configured, enabled but not operating correctly (e.g. QoS not being maintained);

1050 (Vertical slashes)—hacker attempting to insert traffic into the connection. A BEEP indicates an audio alarm is sounded.

It is noted that FIG. 10 is only an illustration. It is not a comprehensive enumeration of the information that can be displayed. Furthermore, the monitoring and displaying functions are not limited to the connection, but can be extended to the resources that make up the connection or that constitute the end elements, etc. As known to those skilled in the art, the concepts of this invention do not have a dependency on the type of information displayed. For example, it can be dynamic and/or static, fixed or variable, short form or long form, continuous or intermittent, etc.

In accordance with the present invention, the connection representation concept is useful among other things, for identifying and solving network operation problems, tuning parameters of network elements and/or connections, and scheduling specific tasks that are triggered by events in the network or simply initiating them directly. This may include actions or tasks for a connections. Thus, since intersections in the matrix can indicate information about connections, one can be provided with an ability to select ("click on") an intersection and initiate an action or task.

Example of actions or tasks include:

Retrieval of additional information/statistics (such as bytes/sec, size of frames, traffic rate ranked by sending address, etc.)

Take action (such as test connectivity between the endpoints, manually refresh the keys, halt traffic, etc.)

Tuning one or more connections (such as alter the QoS parameters, change the mix of traffic allowed through the connection, alter buffer sized, etc.)

Setting alarms, alerts and/or thresholds to use when monitoring a connection.

Figure 11:
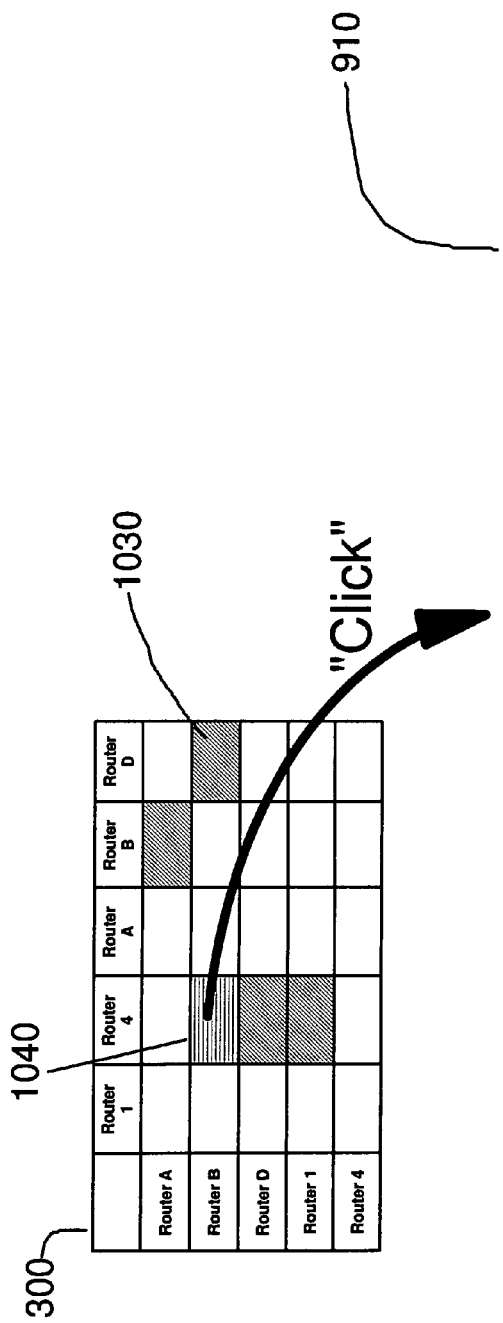
FIG. 11 shows an example of a matrix of connections showing possible problem determination and tuning method.

An example illustrating a problem determination process is shown in FIG. 11. FIG. 11 uses the connection matrix, 300. One selects an intersection and brings up a display, 910, that aids in problem determination or tuning. This could include the setting of thresholds, etc.

Figure 12:
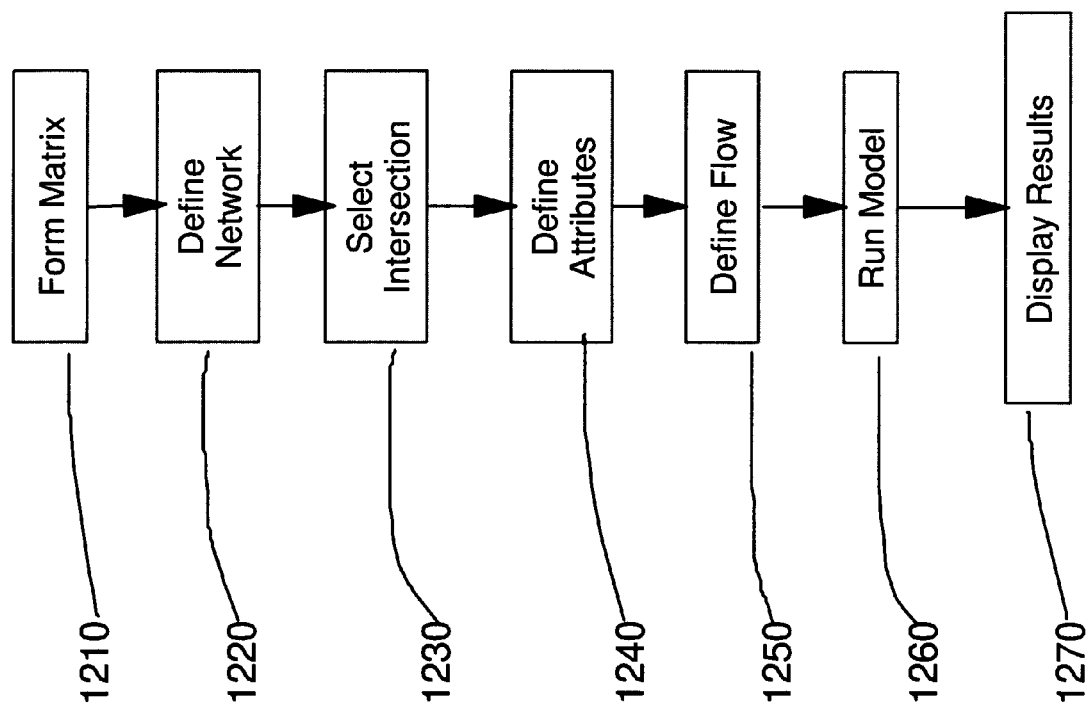
FIG. 12 shows an example of steps for modeling a network.

An embodiment of the present invention performs modeling as shown in FIG. 12. The figure shows steps for the matrix display being used as an input method for modeling tools.

Step 1. Using the matrix method described above, 1210, one defines the network to be modeled, 1220, i.e., define the resources (endpoints) and the connectivity between resources;

Step 2. Given a matrix of connections, 300, one could select an intersection, 1230, and define the attributes, 1240, of the connection, i.e. maximum frame size, TCP/IP window size, etc. One could also define the attributes of the endpoint, i.e. buffer size, speed, etc.;

Step 3. Given the matrix of connections and endpoints and their capabilities, one could then:

Define a work load to flow through the connection and/or between endpoints;

Define the rate of traffic to flow through the connection; and/or

Define dynamic aspects of a flow 1250;

Step 4 Run the model 1260; and

Step 5 Display the results 1270.

One could display results in the same method as one monitors the network (see above).

One could display results within the matrix or endpoints.

This method describes a way to represent relationships between entities. Given this representation, it then provides a framework to perform actions based on the relationship. The entities are often said to constitute a network of elements. The elements and the network can be quite generic. Examples include:

computer networks where the elements are communications devices such as routers or firewalls or combinations of devices;

networks based on any level in a protocol stack, such as applications connectivity at the application layer or MAC (Media Access Control) connectivity at the MAC layer;

An example of an application is the representation of database applications that have connectivity between themselves;

An example of a MAC layer are MAC address domains connected by LAN bridges. Other examples are known to those skilled in the art.

IP networks where elements are devices that contain an IP protocol stack;

Switching systems, including data or telephone systems;

Water systems where the elements are the supply points and the usage points; and Distribution systems where the elements are warehouses and retail stores.

The representation method and framework consists of grouping the elements into catalogs or sets. A catalog is created by standard combinatorial operations that include but are not limited to the following:

add an element to a catalog;

delete an element from a catalog;

change an element in a catalog;

copy or move an element from another catalog;

create a catalog that represents the intersection of elements of two or more other catalogs;

create a catalog that represents the union of elements of two or more other catalogs; and other element and/or catalog operations known to those skilled in the art.

There is generally no restriction on the number or type of elements in a catalog.

Generally, an element in a catalog can be of one of two types:

"atomic" element—the element does not contain other elements, or

"catalog" element—the element is a catalog of other elements.

In the following claims, both types of elements are generically referred to as elements. Thus catalog is a hierarchical grouping construct—a catalog is made up of elements, some of which can themselves be catalogs of other elements, and so on. It is noted that a catalog can contain both "catalog" elements and "atomic" elements with no restriction on the number of either type of elements. In the following, the elements that are members of a catalog that is itself an element within a higher level catalog can be referred to as "sub-elements" of the higher level catalog.

Figure 13:
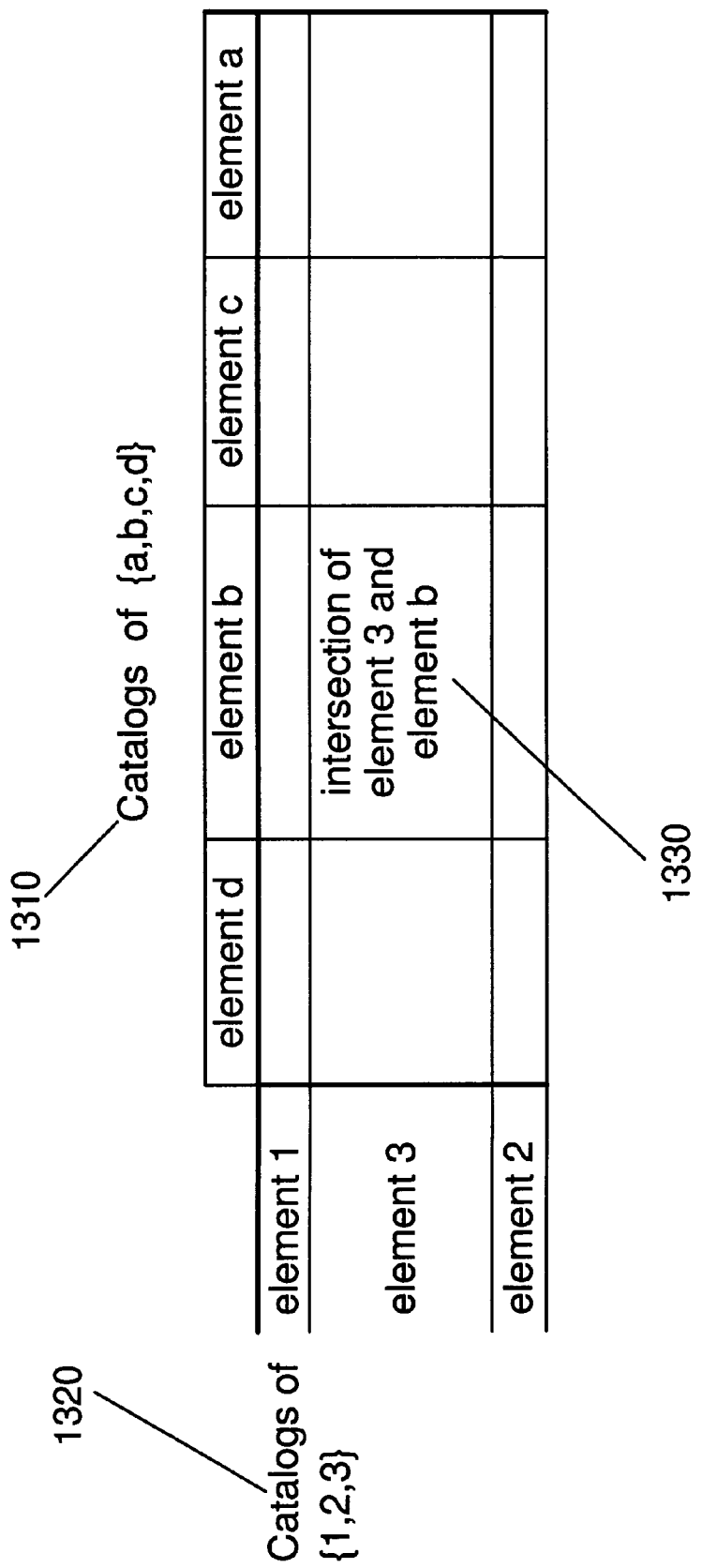
FIG. 13 shows an example of a matrix with catalogs with one intersection identified.

The representation of the interconnection(s) between the element(s) of catalogs is created by a matrix view in which catalog(s)'s elements are placed on the axis of the matrix. The matrix cells formed by intersection of the elements along rows and columns represent the connectivity relationship that exists between the pairs of elements. To those skilled in the art, alternate representations of a traditional row and column matrix can be used. In FIG. 13, one or more catalogs, 1310, whose members are {a, b, c, d} is placed on one axis of the matrix and one or more catalogs, 1320, whose members are {1, 2, 3} is placed on the other axis. The intersection of a pair of elements, 1330, represents the connectivity between the elements. Elements are not required to be positionally dependent. For example, the connectivity of element b and element 3 is represented by the information contained in the intersection of pair of elements {b} and {3}.

Note that it is not a requirement that all intersections represent connections, some intersections may represent no connections. The elements that are placed on one axis of the matrix can be identical to the elements on the other axis of the matrix or they can be different. Uniqueness is not required, either among the elements on the same axis or on different axis. This does not preclude making the elements unique or positionally dependent. If the matrix is too large to be practically displayed, a portion of the matrix can be displayed using typical scroll bar techniques or other methods known to those skilled in the art. Alternatively, making use of the abstraction, one could form a higher-level abstraction of the elements by forming catalog element(s) that contains at least a portion of the elements and displaying the abstracted catalog elements.

If any of the element of a catalog are catalogs in and of themselves, i.e., the element is called a catalog element and it contains sub-elements, the intersection within the matrix of a catalog element with either another catalog element or an atomic element represents both the catalog element and the atomic element relationship abstraction and the sub-elements of that catalog element with the other elements. This can be represented by another matrix, called a sub-matrix, whose axis contain the sub-elements of the catalog element and if present in the original matrix non-catalog elements. It should be recognized within this new sub-matrix, there may be intersections of elements that are catalog elements and this process of creating a new sub-matrix can be repeated. A sub-matrix can be formed when, in the matrix there exists a intersecting cell formed by either a catalog element paired with another catalog element or atomic element.

The matrix representation may also be made to represent directionality of the connections between elements. For example, it could be defined that the flow of traffic within a connection orginates from the elements on one axis and terminated in the elements of the other axis. Further, if the same elements were placed on both axes, except for the matrix diagonal, each pair of elements (one member of the pair from one axis, the other member of the pair from the other axis) would be represented twice, i.e., {a,b} and {b,a}. If the matrix was constructed to represent directionality, each pair would explicitly show the flow in one direction, {a,b} from a to b and {b,a} from b to a.

If in the matrix, an element on an axis is in and of itself a catalog, then the connection relationship represented by a matrix intersection cell associated with that catalog element applies to all sub-elements represented by the catalog element.

Catalogs do not have to be unique, either in their structure or their members, i.e., two or more catalogs can have identical sets of elements. Furthermore, two catalogs may have only a portion of their elements that are identical. Also, when defining the matrix, the same catalog can be used for specifying elements on both the axes or two catalogs can be used, one for each axis. In the former case, obviously, elements on one axis are identical to those on the other. However, the same configuration will also result when two catalogs are used that have identical composition. In general, elements on the two axes of the matrix may have none, some or all of the elements that are common depending on how catalogs are chosen for the axis.

This method can be used to represent a wide variety of networks used in communication, including virtual networks and overlay networks. Virtual networks are often formed by logically partitioning a network's physical connectivity to give the appearance of a physical network that is a logical subset of the real network. Overlay networks are sometimes synonymous with virtual networks, in that a logical network is "overlayed" onto a physical network or a portion of a physical network. More generally, an overlay network is an abstraction of a subset of the real network that is defined by availability of specific service. Examples of these types of networks include but are not limited to:

IPSec networks which provide secure "tunnels" between points in the network,

Quality of Service (QoS or QOS) networks which attempt to provide a class or quality of service for the traffic between points in the network.

Multiprotocol Label Switching (MPLS) networks which use MPLS methods to set up paths through the network.

Virtual LAN (VLAN) networks which form logical LAN(s) based on a subset of the connectivity available in the real physical LANs.

This method can be used to configure all of the possible connections between the catalogs or it can be used to configure a portion of the connections.

This method can also be used to associate tasks with a connection. Any of tasks can be specified to be executed as a result of change in the state of a connection or at a predetermined time or on occurrence of some other event. Tasks can also be formed to modify themselves or other tasks. Once such tasks are assigned, it is also possible to directly invoke any of such tasks through manual intervention. For example, at a defined time or time period, one could invoke a task that changed the attributes of the connection, i.e. at 5:00 each day, all traffic is blocked.

at a defined state or rate of change of state, one could invoke a task that changed the attributes of the connection, i.e., if the throughput of the connection exceeds "n", then lower the priority of all packets that traverse the connection or if the rate of change of utilization of the link is greater than 5% per minute, activate another link between the endpoints.

at a given change in state, such as an unauthorized attempt to access a resource or a link failure, one could invoke a task that sent an alert to network or system management entity or cause a page or fax notification to be sent.

as part of a diagnostic or maintenance test, network administrator may manually invoke an assigned task, for example shutting down a router, or disabling a feature (RSVP/IPSEC/Filtering) on a particular router interface.

An element in a catalog (note that an element can be a catalog in and of itself) or the representation of the connection indicated by the intersection of elements can be an abstract entity. The element can represent an abstraction of physical or nonphysical items. Examples of physical items are routers, gateways, firewalls. Examples of nonphysical items include the IP addresses or IP subnets associated with a router, IP addresses or IP subnets proxied for by a router, groups of users, groups of addresses, attributes of connections or physical devices. Abstract elements also include offerings of services such as quality of service offerings, security offerings, assured delivery and expedited delivery offerings, controlled load services, and service level agreements. Abstract elements can include attributes such as tunnel validity periods, DES, triple DES, RC4, SHA, buffer size, maximum frame size, application type. Other examples are known to those skilled in the art.

A method of displaying the connection relationships using a matrix has been discussed. In some cases, one will display the complete matrix, in others, one may display a portion of the matrix. Note that to those skilled in the art, there are other ways to display a matrix than the ones illustrated in this write-up.

Given that the intersection of two elements is a representation of information either about the elements, their connectivity or some other relationship that exists between the elements, one can also use the same representation to aid in monitoring aspects of this relationship. For example, if the intersection represented a connection, one could display monitoring information about the connection. This could be items like the connection state (is the connection active?), the throughput of the connection, accounting information such as how long the connection has been active or if the throughput is or has exceeded the committed information rate for the connection. Because the intersection can be created when one or both of the elements are catalogs in and of themselves, the information represented by the intersection can represent an abstraction or summary of the information for all or part of the elements that are contained in the element that is in and of itself a catalog. For example, if the two elements forming the intersection were East_Coast_Routers and West_Coast_Gateways, and these elements were catalogs in and of themselves, each containing some number of routers and gateways, the intersection of the elements East_Coast_Routers and West_Coast_Gateways could result in the display of a monitoring of the number of bytes transferred between the two elements (East_Coast_Routers and West_Coast_Gateways). This number of bytes would be the sum of all bytes transferred between all routers and gateways (all the sub-elements derived from the elements East_Coast_Routers and West_Coast_Gateways) that were represented or abstracted into the elements East_Coast_Routers and West_Coast_Gateways.

If there is one element in a catalog and multiple elements in another catalog, the resulting matrix can be said to represent a star network because the representation of the connectivity is between the one element and the multiple elements, a one-to-many topology. If there are multiple elements or there is an element that is in and of itself a catalog of elements in the catalogs that are positioned along the axis of the matrix, the resulting matrix can be said to represent a mesh network, because the representation of the connectivity is between multiple elements on each axis and there is a connection between each element on one axis to every element on the other axis.

A wizard is a tool that aids a person doing a task. Wizards are used to create catalog elements or attributes associated with an element or group of elements. Wizards are also used to aid the creation or deletion of a connection or the modification of an attribute of the connection. For example, a wizard may assist in organizing a catalog;
setting the initial values of attributes;
help by generating context sensitive templates for the elements or their attributes;
assist in defining the relationships between elements;
setting the initial configuration between elements; setting the ongoing relationship or configuration between elements; and
and any other tasks known to those skilled in the art.

When the matrix representation is formed, the connections between the elements can be initialized to connected by default. In a later configuration step, connections that are not desired can be removed. They may be removed by direct action or with the use of a wizard. Likewise, when the matrix representation is formed, the connections between the elements can be initialized to an unconnected state. In a later configuration step, connections that are desired can be added by direct action or with the use of a wizard. Likewise, when the matrix representation is formed, connections can be initialized by rule. For example, connections designated as primary may be formed, all others are not. Note that the use of a wizard to add or remove connections is not dependent on the initialization process.

This invention has the property of inheritance, both at the element and at the connection representation levels. Thus, if an element is in an of itself a catalog, i.e. the element is formed from sub-elements, when an inheritable change is made to an element's attribute, the change is propagated or inherited by the sub-elements. For example, if a catalog had elements {A, B, C} and element A was a catalog containing {A1, A2, A3}. Then an inheritable change in A is propagated to A1, A2 and A3. Because A1, A2 and A3 can be catalogs in and of themselves, the sub-elements that compose them could also receive the change made by A. Because there is no restriction that a element must not be a catalog, there is no restriction on the number of times this principle can be applied. Likewise, if a connection representation was formed from elements that are in and of themselves catalogs, changes in the connection representation are inherited by all connections representations that can be derived from the elements of the all the catalogs of catalogs. For example, assume the highest level catalog, named east_coast, contained 4 elements which were in and of themselves catalogs, named: Miami, Atlanta, Durham, Hawthorn, and each of these contained 3 elements which were in and of themselves catalogs, e.g., the Miami catalog contained router_1, router_2, router_3, and each of these contained 3 elements, e.g. the router 1 catalog contained elements interface_1, subnet_w.x.y.z, IP_address_a.b.c.d. Now, if a 1×1 matrix of east coast versus east coast was specified and an action was done to that intersection formed by the 1×1 matrix, this action would cause a change in all connection representations that can be derived from the elements of the catalogs of catalogs. Examples of actions are the setting of a security policy or a quality of service. Other examples are known to those skilled in the art. In a similar manner, if an attribute of all derivable connection representations or elements was the same for all the connection representations or elements and an attribute of a connection representation or an element was changed, this change could be reflected in the representation of the catalog element or the abstracted connection representation. For example, if the highest level catalog, named east_coast, contained 4 elements which were in and of themselves catalogs, named: Miami, Atlanta, Durham, Hawthorn, and each of these contained 3 elements which were in and of themselves catalogs, e.g., the Miami catalog contained router_1, router_2 router_3, and each of these contained 3 elements, e.g. the router_1 catalog contained elements interface_1, subnet_w.x.y.z, IP_address_a.b.c.d and a 1×1 matrix of east_coast versus east_coast was specified in which an attribute was the same for all derivable connections representations and one of the connections representation's attribute was changed (e.g, east_coast/router_1/interface_1 was set to no connection), the catalog's representation (e.g., east_coast) could indicated that the attribute was not homogeneously applied to all of the derivable connections representations. In a converse manner, if an element was a catalog element containing sub-elements, all derivable sub-elements would inherent the attributes of their "patent" element. If an attribute was not to homogeneously applied (inherited by all sub-elements) to all elements, the catalog element representation could indicate that the attribute was not homogeneously applied to (inherited by) all derivable sub-elements. Note that a sub-element can itself be a catalog and contain sub-elements.

These techniques can be extended beyond the configuration and administration tasks to monitoring at least some portion of the network. In addition to attribute type information for elements or the representation of the connection, one can display monitoring information about the elements or the representation of the connection. For example, one could show, at the matrix intersection, the status of a connection. Examples of status include: whether the connection is active or not, the throughput of the connection, the number of dropped packets/frames due to a quality of service definition. One can also show status associated with the elements at the edge of the matrix. Examples of status include: number of frames transmitted, number of attempts by an unauthorized entity to access the element, average size of outbound buffer used, number of configured tunnels, number of active tunnels. Status can be dynamic or static. The monitored information may be displayed in the form of text, graphics or audio. Examples include a text that is color coded per the status information; for example, a correctly functioning connection may be displayed in a color, such as green, while a failed connection may be displayed in a color such as red. An intrusion attempt may cause an audible alarm. A change in the performance of a connection may be shown. Status for a connection could show a bar graph of the utilization of the connection by connection type. Many other examples of monitoring the status and methods of displaying the information are known to those skilled in the art.

These techniques can be extended beyond the configuration, administration and monitoring tasks to modeling at least some portion of the network. Since the matrix can be used to represent connectivity between elements and the elements can be used to represent workload that the connection will experience, one can use the same network representation to model a network. Attributes of a connection may be specified at the intersection point. The attributes define the type of service the connection offers, such as the number of servers, the server's service time distribution, and the maximum system capacity. Attributes of a workload may include the size of the packet, the interarrival time distribution, and the priority of the packet. Other attributes for the connection and workload are known to those skilled in the art. One can form or derive the network to be modeled from the configuration and/or monitoring methods previously discussed. One can also derive the workloads from the monitoring steps previously discussed. In this way, one can model an existing network and perform investigation based on real or projected network loading and real or projected network configuration. For example, given a network model derived from the real network, one could apply projected workloads to the "real" network and observe the effects on the "real" network. Likewise, one could, given workloads derived from monitoring the real network, apply these "real" workload to a modified network and observe the effects on the "real" workload. One could also export or import information into/out of the model.

This invention can be manufactured in a variety of forms, including but are not limited to:
- web based methods in that web pages are used to create this invention.
- Java based methods,
- stand alone programs,
- integrated into other existing programs.

The invention can be implemented and/or distributed in a variety of forms, including:
- diskettes,
- disks,
- CDs,
- tape,
- downloads from a server (including web based downloads).
- and/or other techniques known to those in the art.

The invention may be implemented as a network apparatus comprising: a matrix module forming a network matrix having at least one matrix row element and at least one matrix column element, and a plurality of network catalogs. Each of the catalogs listing at least one network element. The intersection of each matrix row element with each matrix column element forms a matrix cell, Each network element of a first subset of network catalogs has a connection requirement with each network element of a second subset of network catalogs. Each network element of the first subset of network catalogs forms the matrix row element. Each network element of a second subset of network catalogs forms the matrix column elements. Each matrix cell represents a network connection between each network element of the first catalog and each network element of the second catalog.

In an embodiment at least one network element is a catalog of sub-elements, and/or at least one of the sub-elements is another catalog of sub-elements. and/or the matrix module further forms a network submatrix having at least one submatrix row element and at least one submatrix column element. The intersection of each said at least one submatrix row element with each said at least one submatrix column element forms a submatrix cell. Each network element of a third subset of network catalogs has a connection requirement with each element of a fourth subset of network catalogs. Each element of the third subset of network catalogs forms a submatrix row element, and each network element of the fourth subset of network catalogs forms the submatrix column element. Each submatrix cell represents a network connection between each network element of the third catalog and each network element of the fourth catalog.

In a further embodiment the apparatus includes an attribute modifier module to modify at least one changeable attribute of at least one cell. In some cases the attribute modifier further causes an inheritable change to be inherited by a group of inheritors; and/or a first network element is a first proxy; a second element is a second proxy, and the attribute is setting a Quality of Service, and the step of causing causes the Quality of Service policy to be set at all elements included in the first and second proxies; and/or a first element is a catalog of sub-elements, the attribute is setting an encryption policy, and the step of causing causes the encryption policy to be set at all sub-elements of the first element.

The invention may further be implemented as a method comprising: forming a network matrix having at least one matrix row element and at least one matrix column element; forming a matrix cell at each intersection of each matrix row element with each matrix column element; and forming a plurality of network catalogs; listing at least one network element in each of the catalogs; setting the network element of the catalogs to be the matrix row elements; setting a network element of at least one of the catalogs to be the matrix column elements, and forming a representation of a connection requirement of each respective matrix row element with each respective matrix column element which form each particular matrix cell by the particular matrix cell.

In some embodiments of the method at least one matrix row element is a sub-catalog listing at least one sub-catalog network element; and/or the method further comprises including the sub-catalog network elements within the matrix row elements; and/or at least one matrix column element is a sub-catalog listing at least one sub-catalog network element; and/or the method further comprises including the sub-catalog network elements within the matrix column elements; and/or the method further comprises employing the representation operations such as displaying, inheriting, configuring, administering, monitoring, and/or modeling.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. Even though the embodiments and descriptions often refer to communication networks, the invention is clearly useful for any type of network. Thus, it will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for representing interconnection of a plurality of elements on a network, the method comprising:
   providing a first catalog for a first subset of said elements, and providing a second catalog for a second subset of said elements;

creating a matrix of connection cells formed by an intersection of a pair of elements, wherein a first element of each pair is taken from the first catalog and a second element of each pair is taken from the second catalog; and forming a connection representation for at least a subset of the pairs.

2. A method as recited in claim 1, wherein at least one element is a catalog of sub-elements, and the method further comprises the step of including all sub-elements in the matrix.

3. A method as recited in claim 1, wherein the network is a communications network and at least a subset of the elements includes routers.

4. A method as recited in claim 1, wherein the network is an IP network and at least a subset of said elements have an IP protocol stack.

5. A method as recited in claim 1, wherein at least one particular element in the first catalog is the same as a particular element in the second catalog.

6. A method as recited in claim 1, wherein at least one of the catalogs includes a plurality of sub-catalogs.

7. A method as recited in claim 1, wherein at least a portion of the network is a computer network.

8. A method as recited in claim 1, wherein at least a portion of the network is a virtual network.

9. A method as recited in claim 1, wherein at least a portion of the network is a network implemented using a layer above a physical layer.

10. A method as recited in claim 1, wherein at least a portion of the network is an overlay network.

11. A method as recited in claim 10, wherein at least a portion of the overlay network is an IPSec network.

12. A method as recited in claim 10, wherein at least a portion of the overlay network provides Quality of Service.

13. A method as recited in claim 10, wherein at least a portion of the overlay network is an MPLS network.

14. A method as recited in claim 1, wherein the network includes VLANs.

15. A method as recited in claim 1, further comprising the step of configuring at least a portion of the network employing the representation.

16. A method as recited in claim 1, wherein at least a portion of one catalog is formed using combinatorial operations upon elements of other catalogs.

17. A method as recited in claim 1, further comprising associating at least one task with at least one connection.

18. A method as recited in claim 17, further comprising triggering at least said one task as a result of a change of a state of said one connection.

19. A method as recited in claim 1, wherein at least one of the elements is an abstract entity.

20. A method as recited in claim 19, wherein an element embodies the attributes of Quality of Service.

21. A method as recited in claim 19, wherein an element embodies the attributes of security.

22. A method as recited in claim 1, wherein at least one of the elements is a physical entity.

23. A method as recited in claim 1, further comprising displaying at least one portion of the matrix.

24. A method as recited in claim 1, further comprising monitoring at least one portion of the matrix.

25. A method of claim 1, wherein the matrix is structured such that elements of a row are different from elements of a column.

26. A method of claim 25, wherein at a least a portion of the connections form a star network.

27. A method of claim 1, wherein the matrix is structured such that elements on a the row are identical to elements on a column.

28. A method of claim 27, wherein at a least a portion of the connections form a mesh network.

29. A method as recited in claim 2, wherein at least another element is a second catalog of sub-elements and the method further comprises the step of forming a sub-matrix of said one element with said another element.

30. A method as recited in claim 1, further comprising employing a wizard to form at least a subset of the elements.

31. A method as recited in claim 1, further comprising initializing all connections to a connected state.

32. A method as recited in claim 1, further comprising employing a wizard to determine which connections to be brought to a connected state.

33. A method as recited in claim 1, further comprising initializing all connections to a non-connected state.

34. A method as recited in claim 1, further comprising choosing at least one pair upon which a manipulation is performed.

35. A method as recited in claim 34, further comprising modifying at least one changeable attribute of the connection.

36. A method as recited in claim 35, further comprising causing an inheritable change to be inherited by a group of inheritors.

37. A method as recited in claim 36, wherein a first element is a first gateway, a second element is a second gateway, and the attribute is setting a security policy, and the step of causing causes the security policy to be set at all elements included in the first and second gateway.

38. A method as recited in claim 36, wherein a first element is a catalog of sub-elements, and the attribute is setting a Quality of Service policy, and the step of causing causes the Quality of Service policy to be set at all sub-elements of the first element.

39. A method as recited in claim 6, wherein a sub-catalog includes other sub-catalogs.

40. A method as recited in claim 1, further comprising monitoring at least a portion of a network state in accordance with the representation.

41. A method as recited in claim 40, further comprising displaying at least a portion of the network state.

42. A method as recited in claim 41, wherein the step of displaying includes employing color codes for showing attributes.

43. A method as recited in claim 1, further comprising the step of modeling connections.

44. A method as recited in claim 41, further comprising indicating changes in performance in response to an occurrence.

45. A method as recited in claim 1, wherein a least one element of a particular pair is a sub-catalog, the method further comprising expanding elements of the pair into a sub-matrix.

46. A method for representing on a display a connection representation, the method comprising:
    forming at least one catalog of data elements;
    creating a matrix of catalog elements for the data elements of at least one of said at least one data catalog;
    forming a connection representation between pairs of elements in each said at least one data catalog;
    instantiating connections in the connection representation; and
    employing the matrix in a network action.

47. A method as recited in claim 46, wherein the network action includes an action taken from a group of actions including monitoring, problem determination, tuning and modeling.

48. A method as recited in claim 46, wherein at least one catalog of is a catalog of elements considered for interconnection by themselves.

49. A method as recited in claim 46, further comprising manipulating catalog elements to create at least one new catalog from a union of existing catalogs.

50. A method as recited in claim 46, further comprising employing an operation taken from a group of operations consisting of: typing, ordering, adding, moving and deleting to and from one or more catalogs.

51. A method as recited in claim 47, wherein the operation of typing is a catalog class taken from a group of classes consisting of: Endpoint catalog; Tunnel catalog; Encryption methods catalog; Validity catalog; Action catalog; and Traffic Loading catalog.

* * * * *